United States Patent Office 3,561,996
Patented Feb. 9, 1971

3,561,996
METHOD OF IMPROVING ADHESION OF VINYL ADDITION POLYMER AQUEOUS-BASED COMPOSITION SEALANTS, ETC.
Harold C. Young, Philadelphia, Pa., assignor to Rohm and Haas Company, Philadelphia, Pa., a corporation of Delaware
No Drawing. Filed May 27, 1968, Ser. No. 732,072
Int. Cl. B44d 1/14
U.S. Cl. 117—62.1
14 Claims

ABSTRACT OF THE DISCLOSURE

In accordance with the present invention, it has been found that coating the surface of a caulk or painted layer comprising a thermoplastic polymer, such as a vinyl addition polymer, with certain types of silanes, surprisingly increases the adhesion of the caulk to many substrates, and especially to those of siliceous type, such as glass, ceramics, porcelain, concrete, etc.

---

It has heretofore been suggested to incorporate silanes of various types into vinyl polymer compositions for painting or caulking to improve their adhesion. However, if the caulking composition containing the silane is not used within 1 to 2 months or so of the time when the silane is introduced, no improved adhesion is obtained. Apparently, hydrolysis of the silane occurs and thereby the silane becomes an inert component of the composition. It is generally impractical therefore for the manufacturer of the caulking composition to incorporate the silane in the composition. It is also quite undesirable and impractical for the painter or other workman to incorporate the silane into the caulking composition just before he applies it because of the difficulties of distributing the silane in such a viscous to plastic material.

It has also been proposed heretofore to prime the surfaces to be coated, joined, or sealed by the painting or caulking composition with a dilute solution of a silane. Here again, it is necessary to apply the caulking composition soon after the silane primer has been applied or the benefit of priming with the silane is lost.

In accordance with the present invention, it has been found surprisingly that when a silane or a solution of the silane is applied to the exposed surface of the film of an aqueous-based paint or the exposed surface of the sealing deposit of a caulking composition after it has been put in place, improved wet and dry adhesion to many substrates, such as wood, textiles, metals, metal oxides, and plastic films and articles, and especially on siliceous substrates, such as glass, fiber-glass textiles, fiber-glass reinforced plastic articles, ceramics, porcelain, cement, concrete, tile, etc. are obtained.

Any silane that hydrolyzes in aqueous media to form a reactive hydroxyl group attached to the silicone atom may be used. It appears that the hydrolyzed silane reacts not only with reactive groups in the vinyl addition polymer which constitutes the primary component of the thermoplastic film of the paint or of the caulking composition but also with reactive groups, in the substrates, such as hydroxyl in wood or with some part of the silicate component of the various siliceous substrates mentioned. In the case of thermoplastic compositions, such as paints or caulks which contain fillers of siliceous type, there is apparently reaction with such fillers as well. However, it is not intended that the invention be limited by the theory of action herein described.

Preferred examples of the silanes that may be used are embraced within the Formulas I, II, and III, but the invention is by no means limited to the use of only these examples.

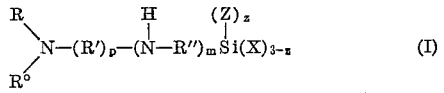

$$(R^2)_n\text{—}Si(X)_{4-n} \qquad (II)$$

$$(R^3)_x Si_2 (Y)_{6-x} \qquad (III)$$

wherein

R and R° may be H or ($C_1$–$C_4$) alkyl and R may be the same or different than R° in any given compound,
R' and R'' are divalent hydrocarbon radicals having 1 to 4 carbon atoms and R' may be the same or different than R'' in a given compound,
p is a number from 0 to 1,
m is a number having a value from 0 to 1,
Z is an alkenyl group having 2 to 4 carbon atoms,
z is a number from 0 to 1,
X is a readily hydrolyzable number selected from the group consisting of halogen, ($C_1$–$C_4$)alkyl, ($C_6$–$C_8$)-aryl, ($C_1$–$C_4$)alkoxy, phenoxy, ($C_1$–$C_4$)alkoxy-($C_1$–$C_4$)alkyl, phenoxy-($C_1$–$C_4$)alkyl, and ($C_1$–$C_4$)alkoxyphenyl, and some or all of the X's may be the same or different in a given compound,
n is an integer having a value of 1 to 2,
$R^2$ is an alkenyl group having 2 to 4 carbon atoms, a glycidoxyalkyl group having 5 to 8 carbon atoms, an acryloxyalkyl group having 5 to 8 carbon atoms, a methacryloxyalkyl group having 5 to 8 carbon atoms, or an aryl group having 6 to 8 carbon atoms,
$R^3$ is a monovalent hydrocarbon radical, namely ($C_1$–$C_4$)alkyl or ($C_6$–$C_8$)aryl,
Y is a halogen, i.e. chlorine, bromine, fluorine, etc., and
x is an integer having a value of 1 to 4.

The substrates with which the invention is concerned are all types of siliceous substrates such as glass sheets, fiber-glass textile, asbestos sheet, asbestos cement products, concrete, stone, stucco, slate, sandstone, granite, ceramics and porcelain; also fiber reinforced plastic articles such as canoes, boathulls or other formed articles made out of fiber-glass reinforced polyesters or other plastic materials; metals such as aluminum, steel, iron, brass; metal oxide layers such as those of aluminum oxide and iron oxide; wood, leather; textiles of cellulose such as of cotton, linen, silk, wool, rayon, cellulose esters such as cellulose acetate nylons, polyesters such as polyethylene glycol terephthalate, acrylonitrile polymers, vinylidene chloride polymers and other vinyl or acrylic ester polymers; films, pellicles, sheets and other shaped articles of various plastic systems such as of cellulose ethers or esters including hydroxyethyl cellulose, methyl cellulose, cellulose acetate, cellulose acetate butyrate, polyesters such as polyethylene glycol terephthalate, nylon, vinyl chloride or vinylidene chloride polymers and copolymers, methyl methacrylate polymers and copolymers, aminoplast or phenoplast resin, organopolysiloxane resins or rubber.

The thermoplastic composition that is deposited as a paint film or applied as a sealing or caulking bead between the two substrates to be joined may be formed of any thermoplastic material including silicone rubbers, alkyd resins of non-thermoset type as well as partially reacted thermosetting systems provided they are in the thermoplastic state at a time convenient for the application of the silane. Examples of such incompletely reacted thermosetting resins include phenol formaldehyde resins, styrenated alkyd resins, and aminoplast resins formed of urea/formaldehyde, melamine/fodmaldehyde or other aminotriazine/formaldehyde condensate.

However, the preferred aqueous-base paints and caulking compositions with which the present invention is concerned are those having a binder of vinyl addition polymer type, such as of polyvinyl acetate and copolymers of vinyl acetate with 5 to 40% by weight of an acid, such as acrylic acid, methacrylic acid, maleic acid, fumaric acid, itaconic acid, crotonic acid, acryloxyacetic acid, methacryloxypropionic acid, etc. Another important class of vinyl type polymer used in caulking compositions are the polymers of acrylic acid esters, methacrylic acid esters, copolymers of two or more such esters with each other, also copolymers of one or more such esters with one or more of the following monoethylenically unsaturated compounds: vinyl acetate, vinyl chloride, vinylidene chloride, acrylonitrile, styrene, vinyltoluene, acrylamide, methacrylamide or any of the acids mentioned above as components of vinyl acetate copolymers.

The most important of the acrylic esters are: ethyl acrylate, methyl acrylate, methyl methacrylate, butyl acrylate and methacrylate, and 2-ethylhexyl acrylate and methacrylate. Copolymers of these esters may be used, especially copolymers of one or more of these esters with 1 to 40% by weight of one of the acids mentioned above, preferably of acrylic acid, methacrylic acid, or itaconic acid.

High molecular weight polymers, e.g. 10,000 to several millions, obtained by emulsion polymerization and of water-insoluble character when in acid form are generally used in such water-base paints and caulking compositions. The caulking composition preferably has a molecular weight of 10,000 to 600,000 and comprises the vinyl polymer binder formulated in an essentially aqueous medium to a high solids content of 75 to 90% with fillers and small amounts of rheology-controlling agents, such as of water-soluble cellulose esters or ethers and adsorptive silicas.

The paints may be similar in general composition but usually have a polymer of 300,000 to a million or more molecular weight and a lower concentration of filler and pigment and, of course, must have lower consistency than caulks to facilitate application by brushing, spraying, or the like. When the vinyl polymer contains acid, it is generally neutralized partially or completely with ammonia, an alkali metal hydroxide, or an alkaline earth metal hydroxide. Examples of suitable caulking compositions are those disclosed in U.S. application Ser. No. 834,605, filed June 10, 1969, which is a continuation of Ser. No. 490,668 filed Sept. 27, 1965, now abandoned, in the hands of a common assignee.

The particular silane or type thereof that is employed may depend upon the particular substrates to be joined by caulking and the particular type of caulking material used or in the case of the painting of a substrate the particular nature of the substrate and the particular type of polymer used as the binder in the paint has an influence in making certain of the silanes a preferred choice for that particular combination. For example, the aminosilanes of Formula I are generally quite useful when applied to siliceous surfaces and when so applied, they may be mixed with a copolymerizable monomeric material such as acrylic acid, a dicarboxylic acid such as acetic acid anhydride, succinic acid anhydride or maleic acid anhydride, or an aldehyde such as formaldehyde or glyoxal. When such additional monomeric material is included in the silane applied to the surface of the coating or caulking deposit, it appears that reaction occurs between the additional monomeric material and the silane and sometimes a component of the substrate or the coating or caulk applied thereto.

Mixtures of the several types of silanes may also be employed; for example, mixtures of an unsaturated silane of Formula II and an aminoalkyl silane of Formula I may be applied. Such mixtures are quite advantageous for the bonding of a silicone rubber layer (either a caulk deposit between two substrates or as a paint layer) to substrates of metal, ceramic, glass, wood, resins, rubber, hydraulic cement, and textiles containing syntheic organic fibers. In most instances, the surfaces to which the silicone rubber is bonded by the subsequent application of a silane of Formulas I, II, or III to the surface thereof will be a material, especially steel, aluminum, aluminum alloys, copper, copper alloys including brass, magnesium, magnesium alloys, stainless steel, textiles of diethylene glycol terephthalate, nylon and so on.

The unsaturated halosilanes of Formula III are quite useful for the bonding of the thermoplastic coating or caulk deposit to glass or to uncured thermosetting resins such as incompletely reacted phenol/formaldehyde resins, melamine/formaldehyde resins or uncured oil modified alkyd resins and allyl resins. For example, a sheet of glass or safety glass may be fitted into an opening within a frame of a car body formed of a fiber-glass reinforced styrenated alkyd while still in uncured state and sealed therein by means of a thermoplastic caulking composition which may then be coated with an alkenyl halosilane of Formula II before the final curing of the styrenated alkyd resin.

The silanes of Formula III are particularly useful for the application to a layer of silicone rubber such as a caulk deposit thereof between substrates of metal, glass, or ceramics to improve the adhesion therebetween.

The silane may be applied at 100% concentration when it is a liquid or it may be dissolved in any suitable solvent for application by brush, spray equipment or any other applicator device. The solvents used may be water or such organic solvents as benzene, toluene, xylene, solvent naphthas of aliphatic, aromatic, or naphthenic type, such as mineral spirits, Varsol, acetone, dioxane, etc. If the particular silane is not too rapidly hydrolyzed, or if the silane can be diluted shortly before application, water may be used as the solvent for applying it to the caulk. The concentration of the solution may be from about 0.1% by weight of the silane up to 50% or more. However, it is generally most practical to employ solutions of 5 to 20% concentration.

It is essential for the purposes of this invention that the silane applied be of low molecular weight since a polymerized silane of molecular weights above about 1,000 is generally prevented by its size from permeating through the paint layer or caulk bead. Preferably, the molecular weight of the silane is below 500.

The silane may be applied immediately after the caulk has been put in position or at any time within about 30 hours thereafter. However, for good results, the silane should be applied before the exposed surface has become "skinned" over by drying to such an extent that diffusion of the silane through the caulk is prevented. Preferably, therefore, the silane is applied within about ½ hour or less. In the case of application to a painted surface, the silane treatment is applied shortly after the paint has become essentially air-dry so that application of the silane does not disintegrate the film of paint.

When caulking is done commercially or industrially, the application of the caulk in the joint is followed immediately with an application of a "slicking" agent to smooth the exposed surface of the caulk in the joint. The treatment with a silane in accordance with the present invention serves to smooth the caulk and also to improve adhesion thereof to the substrate.

The silane treatment does not provide immediate improvement in adhesion but both paint and caulk show greatly improved adhesion, wet and/or dry, after immersion for seven days in water and also on drying after water immersion. In practice, subjection to moisture in the air over an extended period or to rain serves to improve the adhesion of the "silane-slicked" caulk.

The silane surface treatment of an aqueous acrylic caulk (after application of the caulk) has the following advantages over direct incorporation of silane in the caulk:

(1) Elimination of caulk consistency or stability problems as packaged caulk ages;
(2) No loss of improved adhesion properties as the packaged caulk ages.

The advantages of the silane surface treatment method over the use of the silane as a primer in addition to being potentially more convenient (use of one extra step rather than two, i.e. both priming and slicking) also lies in its ability to effect changes in caulk tensile, elongation, recovery and hardness properties if the caulk contains silane-reactive extenders such as silicates and/or silicas.

To assist those skilled in the art to practice the present invention, the following modes of operation are suggested by way of illustration, parts and percentages being by weight and the temperature in ° C. unless otherwise specifically noted.

(1) A glass-block window is mounted in a wood frame within an opening in a stone wall of a house. The joint between the wood frame and the stone wall and the joint between the peripheral edge of the glass-block assembly and the wood frame are filled with a white aqueous-type caulking composition comprising titanium dioxide and calcium carbonate dispersed in an aqueous paste comprising as its main binder component an emulsion copolymer of about 60% butyl acrylate, 33% methyl methacrylate, and 7% methacrylic acid. The caulked joints are then "slicked" by coating the exposed surfaces thereof with a solution in xylene containing 5% of allyldichlorosilylamine. The sealing strips of the caulk show good adhesion after drying and retain a good seal over long periods of weathering.

(2) A glazed ceramic pot is decorated by painting it with a yellow oil-modified alkyd resin paint. About an hour after painting, the painted areas are coated with a 5% solution in mineral spirits of a diphenyldibromosilane. The painted areas are then cured under an infrared lamp. The decorated areas adhere well to the pot even when washed.

(3) A glass-fiber curtain is decorated by the application to selected areas of a red-colored water-base paint containing as its main binder an emulsion copolymer of 80% ethyl acrylate, 28% styrene, and 2% of acrylic acid. About an hour later, the painted areas are coated with glycidyloxyethyltriethoxy silane. The painted areas adhere well and are washable.

(4)(a) A caulking composition of 82.6% solids is made up by mixing 430.17 lbs. of a 55% solids aqueous dispersion of an emulsion copolymer of 81.5% ethyl acrylate, 15% methyl methacrylate, and 3.5% itaconic acid, 9.46 lbs. of tert-octylphenoxypoly(39)ethoxyethanol, 10.65 lbs. of sodium hexametaphosphate, 124.21 lbs. of a plasticizer for the copolymer (an oxypropylene derivative of m,p-cresylic acid), 26.91 lbs. mineral spirits, 1.27 lbs. of a 30% aqueous polymethacrylic acid, 692.06 lbs. of pigment grade calcium carbonate extender, and 17.22 lbs. of titanium dioxide pigment.

(b) Peel adhesion tests (dry and wet) on glass.—The composition of part (a) hereof is applied over the surface of glass plates (3" x 6" x ¼" thick) with a caulking gun and then two, one-inch wide x 10-inch long strips of desized, grade A airplane fabric of cotton (4.28 ounces per yard, 80/84 thread count), are laid lengthwise over the caulking compound. The entire assembly is then covered with a 10-inch x 12-inch sheet of 1 mil Mylar (polyethylene glycol terephthalate) film (which serves as a release member). A cylinder (approximately 2½" diameter x 6½" long) and sufficiently rigid to depress the compound when pressure is applied, is rolled across the assembly in such a manner as to avoid entrapping air and until the thickness of the compound between the cloth and the test surface is reduced to ⅟₁₆ inch. The Mylar sheet is then withdrawn carefully so as not to disturb the assembly underneath. One-half hour later, the silane solution (of various concentrations) is applied by brush over the entire exposed surface of the fabric, thoroughly wetting the surface. When the surface is no longer wet to finger touch, a ⅟₃₂-inch thick layer of the caulk is applied over the assembly surface to minimize any chance of adhesion failure between the cloth and the caulk compound during subsequent peel testing.

The panel or plate thus prepared is allowed to air cure at 25° C. and 50% relative humidity for 7 days. To test for dry adhesion, the compound is then cut through to the glass surface with a rabor blade along the edges of the cloth strips. The plate bearing 2 test specimens is then placed in an Instron Tester or similar type tensile test machine and the fabric is pulled back on itself at an angle of 180° to peel the caulking compound specimen from the test surface. The rate of separation of the jaws of the machine is at 2 inches per minute giving a peel rate of 1 inch per minute. The peel test is run during a 1½ minute timed interval. If the cloth strip begins to peel away from the compound during the test, the strip of compound is cut across with a sharp razor blade in order to get separation at the interface between the compound and test surface.

To test the compound for wet adhesion to the test substrate, the test panels are immersed in water for 7 days (after the initial 7-day air-cure period). The test panels are then removed from the water and cut through to the substrate and tested immediately (while wet). The untreated controls (no silane surface treatment) are immersed in water in containers separate from the silane-treated specimens to prevent any contamination of the untreated controls with silane.

The averaged peel strength in pounds per inch of specimen width is obtained during each determination by using the integrator attachment on the testing machine which measures the tensile force and integrates over the entire period selected for peeling and calculating by the following formula:

$$P = \frac{XS}{X_0}$$

where

P=average peel strength in lbs./inch width
X=Integrator reading over the period of test
$X_0$=Integrator reading when a predetermined standard load is applied
S=predetermined standard load in pounds.

(c) The dry peel test procedure of part (b) (measured after a cycle consisting of 7-day drying, 7-day immersion in water and final 7-day drying) is carried out using solutions in mineral thinner of glycidyloxypropyl trimethoxyl silane having concentrations of 0.5%, 1% and 5.0%. The control test specimens received no treatment with a silane. The test results are summarized in the following Table I:

TABLE I

| Percent silane | Peel adhesion (lbs./in.) | Failure type |
|---|---|---|
| None [1] | About zero | No adhesion to glass. |
| 0.5 | 6.4 | Cohesive (in caulk). |
| 1.0 | 6.9 | Do. |
| 5.0 | 6.3 | Do. |

[1] The initial dry adhesion of this control (no soaking) is 2.5 lbs./in. (adhesion failure).

(d) The wet peel test procedure of part (b) is carried out with the same silane as in part (c) but using the following concentrations: 100%, 0.5%, 1%, 5%, and 20%. The results are given in Table II:

TABLE II

| Percent silane | Wet peel adhesion [1] (lbs./in.) | Failure type |
|---|---|---|
| None | About zero | No adhesion to glass. |
| 0.5 | 2.5 | Cohesive (in caulk). |
| 1.0 | 3 | Do. |
| 5.0 | 4.5 | Do. |
| 10.0 | 5.1 | Do. |
| 20.0 | 6.1 | Do. |
| 100 | High | Fabric peeled from caulk. |

[1] 7-days drying, 7-days immersion in water, and then tested while wet.

(e) Glazed ceramic tiles are used as test panels instead of glass for determining the dry and wet peel strengths of the caulking composition of part (a) hereof using a 5.0% solution in mineral spirits of glycidyloxypropyl trimethoxy silane.

A control panel in which the caulk was not subjected to treatment with the silane is also tested. Both the control panel and the silane treated panel show about the same dry peel strengths (2.5 to 2.6 pounds per inch width) whereas the wet peel strength showed that the untreated caulk test panel has no adhesion to the tile whereas the treated panel shows 6.5 pounds per inch width and fail cohesively, i.e. within the caulk itself.

(f) The tensile strength and flexibility of a strip of the caulking composition of part (a) which had been subjected to a 7-day drying period is compared with the corresponding properties of such a strip treated with a 5.0% solution in mineral spirits of glycidyloxypropyl trimethoxy silane before the 7-day drying. The properties measured are shown in Table III:

TABLE III

| | Untreated | Surface treated |
|---|---|---|
| Tensile properties, p.s.i. at— | | |
| Maximum stress | 21.4 | 45.0 |
| Break | 9.2 | 18.9 |
| Percent elongation at— | | |
| Maximum stress | 320 | 190 |
| Break point | 389 | 270 |

(5) When the caulk composition of procedure (4)(a) above is applied to a glass panel and is treated with a 5.0% aqueous solution of the glycidyloxypropyl trimethoxy silane and then subjected to the wet peel test, the wet adhesion is found to be 7.2 pounds per inch whereas there is no adhesion to the glass when the caulking composition is not treated with the silane.

(6) Similar improved dry and wet adhesion results are obtained when the same caulk composition of Example (4)(a) is applied to glass panels which are prepared for the dry and wet peel test procedure of Examples (4)(c), (d) and (e) but the silane is replaced with an aminomethyl trichlorosilane in one instance and by a methacryloxyethyl tributoxy silane in another instance.

(7) Improved wet adhesion is obtained when the caulk composition of Example (4)(a) is applied to light, white pine wood panels which are prepared for the dry and wet peel test procedure of Example (4)(c), using a solution in mineral thinner of glycidyloxypropyl trimethoxy silane having a concentration of 5.0%.

TABLE IV

| Percent silane | Wet peel adhesion (lbs./in.) | Failure type |
|---|---|---|
| None [1] | 0.4 | 20% light cohesive—mainly adhesive failure. |
| 5.00 [1] | 2.2 | 80% light cohesive failure. |

[1] Initial dry peel adhesion results of 3.5 lbs./in. (adhesive failure when tested).

(8)(a) Fabric peel from caulk test specimens is often encountered in the peel adhesion test procedure described in Example (4)(b). If an unsized glass fiber fabric is substituted in the Example (4)(b) procedure while using the caulking composition described in Example (4)(a), and a 5.0% solution in mineral thinner of glycidyloxypropyl trimethoxy silane is applied over the fabric which has been rolled onto the caulk surface, peeling of this glass fabric from the test caulking compound does not occur during the peel test interval if there is a 1/32 inch thick caulk back-up layer as described in (4)(b), whereas with the analogous cotton airplane fabric peel test lay-up, the cotton fabric often peels from the test caulking compound during the peel test interval.

(b) The caulk compound described in (4)(a) is applied in panel joints of a glass fiber reinforced polyester patio cover and is followed with surface treatment of the caulk in the joints with a 5% solution in mineral thinner of an aminofunctional silane, $$H_2N(CH_2)_2HN(CH_2)_3Si(OCH_3)_3$$

This results in a caulk which possesses the wet adhesion required to withstand exterior exposure on the glass fiber reinforced polyester substrate, and has improved dry adhesion on continuing dry-wet-dry cycles of exterior exposure.

(c) A window panel made from a clear styrene-diluted polyester resin (without fiber-glass reinforcement) is sealed in place in an exterior-exposed alkyd-painted wall opening with the caulking compound described in (4)(a) and the caulk surface is treated with a 5.0% solution in mineral thinner of a methacryoxypropyl trimethoxy silane.

(9)(a) A caulking composition of 78.5% solids is made up by mixing 526.68 lbs. of a 55% solids aqueous dispersion of an emulsion copolymer of 81.5% ethyl acrylate, 15% methyl methacrylate and 3.5% itaconic acid, 11.57 lbs. of tert-octyl-phenoxypoly (39) ethoxy ethanol, 19.23 lbs. of ethylene glycol, 8.80 lbs. of sodium hexametaphosphate, 86.99 lbs. of a plasticizer for the copolymer (an oxypropylene derivative of m,p-cresylic acid), 3.59 lbs. of mineral spirits, 1.08 lbs. of a 30% aqueous polymethacrylic acid, 534.51 lbs. of a pigment grade amorphous silica extender, 21.67 lbs. of titanium dioxide pigment, and 13.04 lbs. of a fumed silica thixotropic agent. Peel adhesion test specimens on glass plates are prepared as described in (4)(b) above and the caulking compound is surface-treated as described in (4)(b) with a solution in mineral thinner of glycidyloxypropyl trimethoxy silane having a concentration of 5.0%. The wet-peel adhesion results are of significantly improved order versus the untreated control caulk. (See Table V.)

TABLE V

| Percent silane level: | Wet peel adhesion (lbs./in.) |
|---|---|
| None [1] | No adhesion. |
| 5.0 [1] | 7.5, 80% cohesive failure. |

[1] Dry peel adhesion values of 7–8 lbs./in., cohesive-adhesive failure.

(10) The adhesion of brush-applied acrylic paint to a glass panel is improved on application of a mineral thinner solution containing glycidyloxypropyl trimethoxy silane at a 5.0% level, to the paint surface shortly after the paint has attained a firmly coalesced stage (1 hour after paint application) in the substrate. The acrylic paint composition of 58.0% solids is made up by reducing a 650.9 lb. pigment paste with 507.1 lbs. of a 46% solids aqueous dispersion of an emulsion copolymer of about 66% ethyl acrylate, 32.5% methylmethacrylate and 1.5% methacrylic acid, 9.0 lbs. of a di-(phenyl mercuric) dodecenyl succinate preservative, 2.0 lbs. of a long-chain fatty acid antifoam, 8.0 lbs. of water, 1.0 lb. of conc. (28%) NH$_4$OH. The pigment paste used in the paint preparation consists of 2.0 lbs. of a t-nonyphenoxy poly(100)ethoxyethanol ether, 9.0 lbs. of a 25% aqueous dispersant solution of the sodium salt of a polymethacrylic acid, 89.0 lbs. of water, 225.0 lbs. of rutile titanium dioxide pigment, 25.0 lbs. of anatase titanium dioxide pigment, 30.0 lbs. of water ground mica extender (325 mesh), 170.9 lbs. of calcium carbonate pigment grade extender, 75.0 lbs. of a 2% aqueous solution of a hydroxyethyl cellulose thickener, and 25.0 lbs. of ethylene glycol (as an antifreeze agent) Table VI summarizes the results.

TABLE VI.—PEEL ADHESION OF ACRYLIC PAINT

| Percent silane | Dry adhesion | Wet adhesion (7-day water soak) |
|---|---|---|
| None | 0.3 | (1) |
| 5.0 | 1.0 | 1.0 |

[1] No adhesion.

(9) Procedure (2) is repeated replacing the silane with dimethyltetrachlorodisilane in one instance, with triphenyltrichlorodisilane in another and with vinyltrichlorosilane in a third. Similar results are obtained.

I claim:
1. A method of improving adhesion of a layer of an aqueous base composition to a substrate, said composition having a binder of a vinyl addition emulsion polymer and containing a pigment, filler or mixture thereof, which comprises applying a water hydrolyzable liquid silane to the exposed surface of the layer shortly after said layer is applied to said substrate, said silane having a molecular weight of below about 1,000 so as to favor penetration of such silane through said layer, whereby moisture which is present is allowed to cause hydrolysis of the silane and the hydrolyzed silane reacts to improve the adhesion of the layer to the substrate.

2. A method as defined in claim 1 wherein said composition is a paint and said silane is applied shortly after the paint becomes essentially air-dry.

3. A method as defined in claim 1 wherein said composition is a caulk and said silane is applied within about 30 hours after the caulk has been applied to said substrate.

4. A method as defined in claim 1 in which the composition contains a siliceous filler or pigment or both.

5. A method as defined in claim 4 in which the composition is in contact with a siliceous substrate.

6. A method as defined in claim 1 in which the composition is a strip of caulk which is in contact with a siliceous substrate.

7. A method as defined in claim 1 in which the vinyl addition polymer contains 5 to 40% by weight of carboxylic acid-containing monomer units in the acid form or in the form of salts thereof with ammonia, an alkali metal hydroxide, or an alkaline earth metal hydroxide.

8. A method as defined in claim 7 in which the vinyl addition polymer is a copolymer of at least one ($C_1$–$C_8$) alkyl ester of acrylic or methacrylic acid and from 5 to 40% by weight of a monoethylenically unsaturated carboxylic acid.

9. A method as defined in claim 8 in which the silane is applied in undiluted form.

10. A method as defined in claim 8 in which the silane is applied in a solvent at a concentration of at least 0.5% by weight.

11. A method as defined in claim 8 in which the silane is applied in a solvent at a concentration of 5 to 20% by weight.

12. A method as defined in claim 1 in which the silane is glycidyloxypropyl trimethoxy silane.

13. A method as defined in claim 1 in which the silane is aminoethyltrichlorosilane.

14. A method as defined in claim 1 in which the silane is methacryloxyethyl tributoxy silane.

References Cited
UNITED STATES PATENTS

| | | | |
|---|---|---|---|
| 2,551,232 | 5/1951 | Balis et al. | 117—132(BS)X |
| 2,551,233 | 5/1951 | Balis et al. | 117—62.1X |
| 2,557,786 | 6/1951 | Johannson | 117—123(C)X |
| 3,061,467 | 10/1962 | Vincent | 117—132(BS)X |
| 3,453,243 | 7/1969 | Hartlein | 117—72X |

WILLIAM D. MARTIN, Primary Examiner

R. HUSACK, Assistant Examiner

U.S. Cl. X.R.

117—72, 75, 76, 118, 123, 124, 126, 132